United States Patent [19]

Burger

[11] 3,921,103

[45] Nov. 18, 1975

[54] CIRCUIT ARRANGEMENT FOR FREQUENCY-DIFFERENTIAL PHASE MODULATION

[75] Inventor: Erich Burger, Unterpfaffenhofen, Germany

[73] Assignee: Siemens Aktiengesellschaft, Berlin & Munich, Germany

[22] Filed: Apr. 18, 1974

[21] Appl. No.: 462,031

[30] Foreign Application Priority Data

May 15, 1973 Germany ........................... 2324542

[52] U.S. Cl. ................ 332/11 D; 178/67; 325/38 B

[51] Int. Cl.² ........................................ H03K 13/22

[58] Field of Search ....... 332/11 R, 11 D; 325/38 R, 325/38 A, 38 B, 163; 178/67

[56] References Cited

UNITED STATES PATENTS

| | | | |
|---|---|---|---|
| 3,131,363 | 4/1964 | Landee et al. | 332/11 |
| 3,341,776 | 9/1967 | Doelz et al. | 325/163 X |
| 3,412,206 | 11/1968 | Bizet et al. | 325/163 X |
| 3,619,503 | 11/1971 | Ragsdale | 325/38 R |
| 3,739,277 | 6/1973 | Schneider et al. | 325/163 X |
| 3,816,657 | 6/1974 | Fletcher et al. | 178/67 |

*Primary Examiner*—Alfred L. Brody

[57] ABSTRACT

A circuit arrangement is described for frequency differential phase modulation of data signals. The modulation circuit is supplied with data in the form of binary words. These influence a phase modulated signal in such manner that in the event of a change in only one bit, the phase of the phase modulated signal changes by a minimum phase difference. A coder assigns binary words classified in accordance with the Gray code. These words have binary values which increase in a monotonous fashion. A phase modulator accordingly assigns the words monotonously increasing phases.

5 Claims, 9 Drawing Figures

CIRCUIT ARRANGEMENT FOR FREQUENCY-DIFFERENTIAL PHASE MODULATION

BACKGROUND OF THE INVENTION

The invention relates to a circuit arrangement for the frequency-differential phase modulation of signals. This circuit arrangement is supplied with data in the form of binary words, by means of which a phase-modulated signal is influenced in such manner that in the event of a change in only one bit of the binary words, the phase of the phase-modulated signal alters by a minimal phase difference.

A known modulator as described in U.S. Pat. No. 1,816,492 consists of a serial-parallel converter, a coder and a phase modulator. The signal which is to be transmitted is conducted to the serial-parallel converter, and the outputs of the latter are connected to the inputs of the coder. The coder and the phase modulator thus influence the modulated signal in such manner that in the event of a change in one bit of the signal supplied at the input, the phase of the modulated signal changes by the minimum phase difference which can occur in the phase modulation process in question. If, for example, this is a four-stage phase modulation, the minimum occurring phase difference will amount to 90°.

These known phase modulators have, however, suffered from the disadvantage that they are relatively complex and are relatively expensive to construct.

An object of the invention, therefore, is to provide a modulator for frequency-differential phase modulation which is distinguished in relation to the known forms of modulator construction by less complexity and lower expense.

SUMMARY OF THE INVENTION

In accordance with the invention, in a circuit arrangement of the type described hereinabove, a coder is provided which assigns binary words classified in accordance with the Gray code words whose binary value increases in monotonous fashion. A phase modulator is also provided which assigns the words in monotonously increasing phases.

The circuit arrangement in accordance with the invention is characterised in that the phase modulators may be constructed using gate circuits, with a comparatively lower financial outlay for circuitry. This advantage becomes increasingly manifest the greater the number of phase modulation stages. Even in the case of four-stage phase modulation, and all the more in the case of eight-stage modulation, the relatively low expense for the phase modulators proves advantageous in comparison to the expense required for the additional coder.

If a larger number of data frequencies are to be simultaneously phase-modulated it is desirable to transfer the signals, emitted from the outputs of the additional coder, in serial form into shift registers and conduct them in parallel form via a buffer store in groups to phase modulators which emit phase-modulated signals of various frequencies.

BRIEF DESCRIPTION OF THE DRAWINGS

The principles of the invention and exemplary and preferred embodiments thereof will be described in the following making reference to FIGS. 1 to 9, identical components appearing in several Figures being marked with the same reference letters and numerals; the small letters used in the several figures refer to individual terminals of the various components.

DETAILED DESCRIPTION OF THE DRAWINGS

Figure 1:
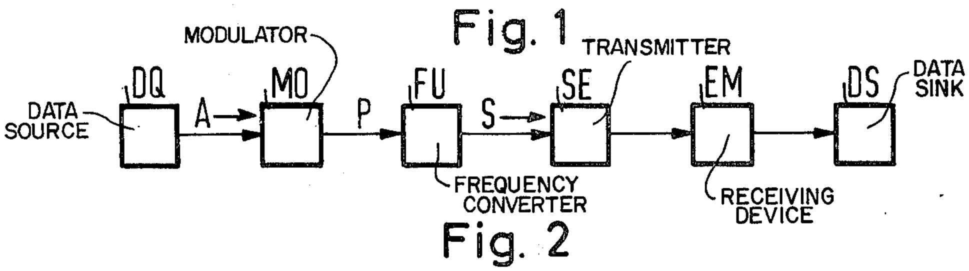
FIG. 1 is a block circuit diagram of a system for transmitting data by means of frequency-differential phase modulation.

In accordance with FIG. 1, data signals are conducted from the data source DQ in the form of a signal A to modulator MO which feeds a frequency-differential-phase-modulated signal P to a frequency converter FU. An output signal S of the frequency converter FU is conducted to a transmitter SE, and the signal from the latter is conducted across a transmission path to a receiving device EM. To this receiving device EM is connected a data sink DS, for example a teleprinter, a date viewing device or a data processing system.

Figure 2:
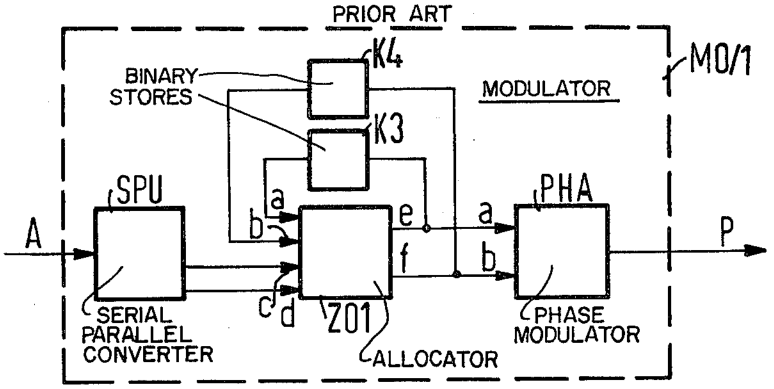
Fig. 2 PRIOR ART
FIG. 2 is a block circuit diagram of a prior art modulator.

FIG. 2 illustrates a prior art modulator Mo/1 as described in U.S. Pat. No. 1,816,492 which may be used in place of the modulator MO represented in FIG. 1. This known modulator MO/1 consists of a serial-parallel converter SPU, an allocator Z01, of two binary stores K3, K4 and of a phase modulator PHA. The signal A which consists of individual bits following one another in serial fashion, is conducted to the converter SPU which feeds the bits to inputs *c* and *d* of the allocator Z01. The outputs *e* and *f* of the allocator Z01 are connceted via the binary stores K3 and K4 to the inputs *a* and *b* of the allocator Z01. In this way the binary values emitted from the outputs *e* and *f* are stored in the binary stores K3 and K4, respectively, and conducted to the inputs *a* and *b*, respectively. The mode of operation of the allocator Z01 and the binary stores K3, K4 is shown in the following Table 1.

Table 1

| ab | cd 00 | 01 | 11 | 10 |
|---|---|---|---|---|
| q0=00 | q0/00 | q1/01 | q2/11 | q3/10 |
| q1=01 | q1/01 | q2/11 | q3/10 | q0/00 |
| q2=11 | q2/11 | q3/10 | q0/00 | q1/01 |
| q3=10 | q3/10 | q0/00 | q1/01 | q2/11 |

In association with the two binary stores K3 and K4, the allocator Z01 can assume a total of four different states which are referenced *q*0, *q*1, *q*2, *q*3. In the first column of Table 1 are entered the fed-back binary words which are conducted across the inputs *a* and *b* to the allocator Z01 and which simultaneously characterize the individual states. If, for example, the fed-back binary word 00 lies at the inputs *a* and *b*, the state *q*0 exists.

The four other columns in Table 1 relate to the binary words which are conducted via the inputs *c* and *d* to the allocator Z01. These are the binary words 00, 01, 11, 10. These binary words are classified in a sequence corresponding to the Gray code. In dependence upon the binary words *c, d* and in dependence upon the relevant states *q*0 to *q*3, in Table 1 the oblique lines are preceded by the resultant following states *q*0 to *q*3 and they are followed by the binary words which are to be fed back and which are emitted via the outputs *e* and *f* of the allocator Z01. With the binary word *cd* = 11, the state *q*0 follows from the state *q*2 in accordance with Table 1, and the binary word 00 is emitted via the outputs *e* and *f*.

With the state *q*0, the binary words *cd* = 00, 01, 11 and 10, classified in accordance with the Gray code are assigned binary words 00, 01, 11 and 10, respectively, which are likewise classified in accordance with the Gray code. Even assuming other states *q*1, *q*2, *q*3, the binary values *c, d* classified in accordance with the Gray code are assigned binary words likewise classified in accordance with the Gray code.

The binary words emitted by the allocator Z01 are conducted to the inputs *a* and *b* of the phase modulator PHA which emits the phase-modulated signal P. In the present case this is a four-stage phase modulation in which the minimum phase difference amounts to 90°. If the words conducted to the phase modulator PHA via the inputs *a* and *b* are 00, 01, 11 and 10, the phase-modulated signal P will possess a phase of 0°, 90°, 180°, and 270°, respectively. There is an overall determinate assignment of the binary words conducted to the inputs *c* and *d* of the allocator Z01 to the phases of the signal P. As a result of this assignment, the phase of the signal P alters by the minimum phase difference — and in the present case by 90° — if one bit of the binary words conducted to the inputs *c* and *d* should change. If, for example the binary words 00, 01, 11, 10 are conducted to the inputs *c* and *d* of the allocator Z01, the signal P will in turn possess the phases 0°, 90°, 180° and 270°. This assignment exists when the dibit supplied via the inputs *a* and *b* of the coder K01 is 00. If the dibit 01 is conducted via these inputs *a* and *b* to the allocator Z01, then at the inputs *c* and *d* of the allocator Z01 the dibits 00, 01, 11, 10 will in turn produce the phases 90°, 180°, 270°, 0°. The phase modulated signal P is thus in this case influenced in such a manner that in the event of a change in one bit of the dibit conducted to the inputs *c* and *d*, the phase of the modulated signal P will alter by the minimum phase difference of 90°.

Figure 3:
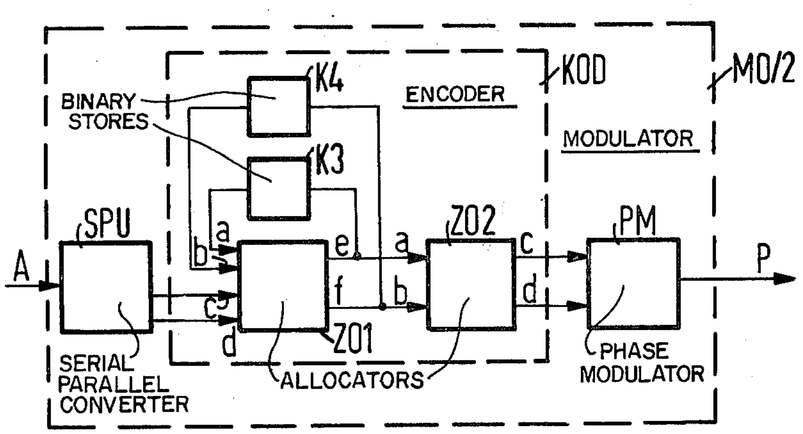
FIG. 3 is block diagram of an embodiment of a modulator constructed according to the invention.

FIG. 3 shows the modulator MO/2 in an illustration which is composed not only of the serial-parallel converter SPU and of the allocator Z01, but also of the second allocator Z02 and of the phase modulator PM. The allocator Z02 possesses two inputs *a* and *b* and two outputs *e* and *f* and operates in accordance with Table 2.

If the dibit 01 appears at the inputs *a* and *b* of the allocator Z02, the dibit 01 is emitted via the latter's outputs.

Table 2

| a | b: 0 | b: 1 |
|---|---|---|
| 0 | 00 | 01 |
| 1 | 11 | 10 |

The two allocators Z01, Z02 and the two binary stores K3 and K4 together form the coder KOD which operates in accordance with Table 3.

Table 3

| ab | cd: 00 | 01 | 11 | 10 |
|---|---|---|---|---|
| q0=00 | q0/00 | q1/01 | q2/10 | q3/11 |
| q1=01 | q1/01 | q2/10 | q3/11 | q0/00 |
| q2=11 | q2/10 | q3/11 | q0/00 | q1/01 |
| q3=10 | q3/11 | q0/00 | q1/01 | q2/10 |

Table 3 is of a similar form to Table 1. The first column again shows the four states *q*0, *q*1, *q*2, *q*3 in dependence upon the binary words conducted to the inputs *a* and *b* of the allocator Z01. The binary words *cd* = 00, 01, 11, 10 which are conducted as input signals to the inputs *c* and *d* of the allocator Z01 are again classified in accordance with the Gray code. With the state *q*0, in dependence upon these binary words 00, 01, 11, 10, the words 00, 01, 10, 11, whose binary values increase in monotonous fashion, are emitted via the outputs *c* and *d* of the second allocator Z02. For the duration of the state *q*1, the binary words 10, 00, 01, 11 is supplied to the input and likewise classified in accordance with the Gray code are assigned in turn, the words 00, 01, 10, 11 whose binary values also increase in monotonous fashion. A similar situation exists in the case of the states *q*2 and *q*3. For the duration of the state *q*3, the binary words 01, 11, 10, 00 supplied to the input are, for example, assigned the words 00, 01, 10 and 11, the binary values of which likewise increase in monotonous fashion.

The phase demodulator PM obtains the signals emitted via the outputs c and d of the allocator Z02 and emits the phase modulated signal P. Here, the words 00, 01, 10, 11 whose binary values increase in monotonous fashion, are assigned to the monotonously increasing phases 0°, 90°, 180°, 270° of the phase modulated signal P.

In the case of an eight-stage modulation, the coder KOD illustrated in FIG. 3 assigns the words 000, 001, 010, 011, 100, 101, 110, 111 in turn to the binary words 000, 001, 011, 010, 110, 111, 101, 100. These words, whose binary values increase again in monotonous fashion are assigned the monotonously increasing phases 0°, 45°, 90°, 135°, 180°, 250°, 270°, 315° by the phase modulator PM.

The coder KOD and the phase modulator PM together produce the same assignment of the binary words conducted to the inputs *c* and *d* of the allocator Z01 to the phases of the signal P as is the case using the allocator Z01 represented in FIG. 2 and the phase modulator PHA.

The modulator Mo/2 in FIG. 3 in fact requires the additional allocator Z02, but is characterized in that the phase modulator PM may be realized with a lower technical outlay than the phase modulator PHA represented in FIG. 2. This advantage becomes increasingly manifest the greater the number of phase modulators PM since independently of the number of required phase modulators PM, only one single additional allocator Z02 is required.

Figure 4:
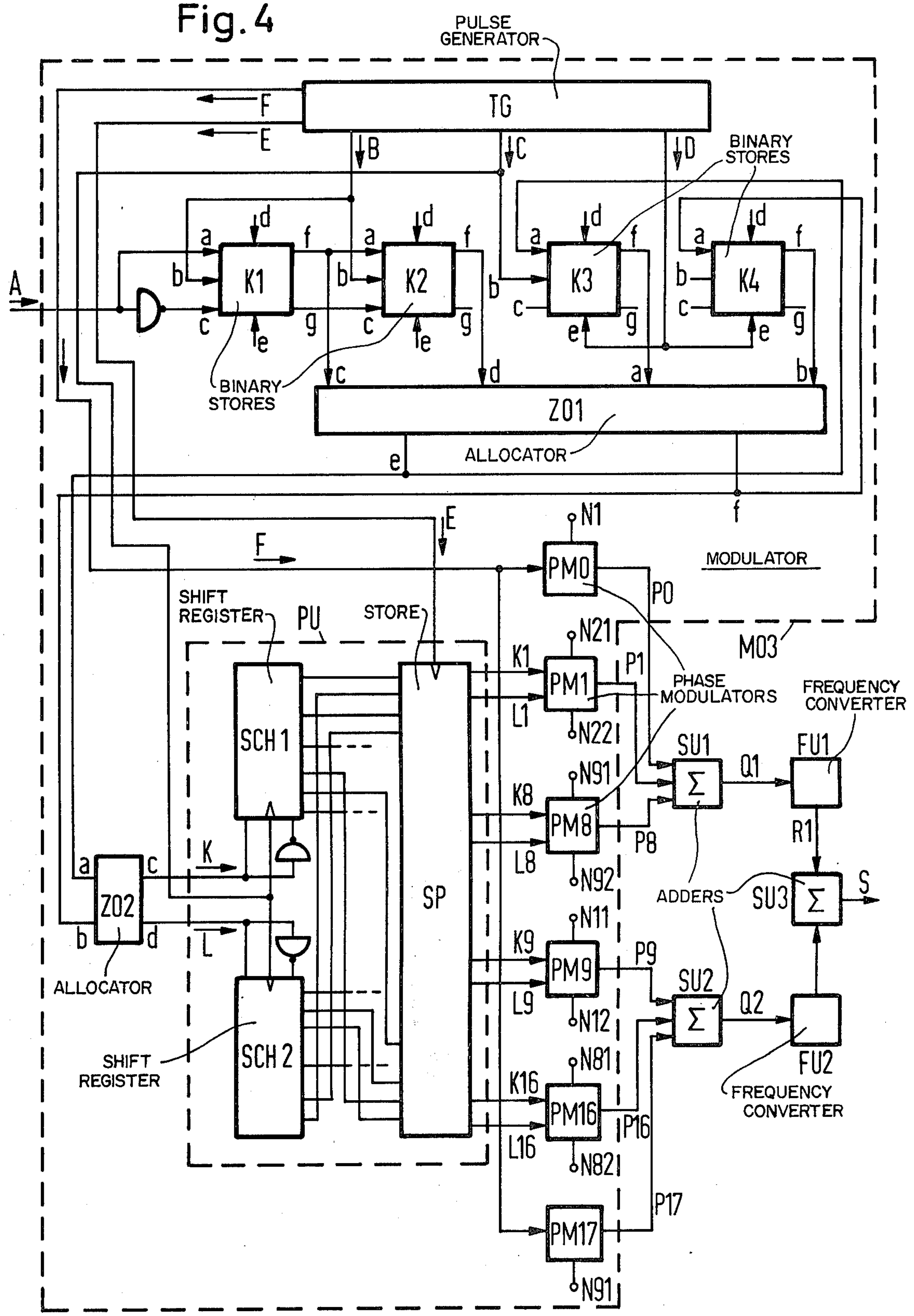
FIG. 4 is a schematic diagram of a further embodiment of a modulator and of a frequency converter constructed according to the invention.

FIG. 4 shows in more detail the modulator MO/3, which may be used in place of the modulator MO represented in FIG. 1 and which is an exemplary embodiment of the modulator MO/2 shown in FIG. 3. This modulator MO/3 includes a pulse generator TG, bistable trigger stages K1, K2, K3, K4, allocators Z01, Z02, two shift registers SCH1, SCH2, store SP and modulators PMO to PM17.

Figure 5:
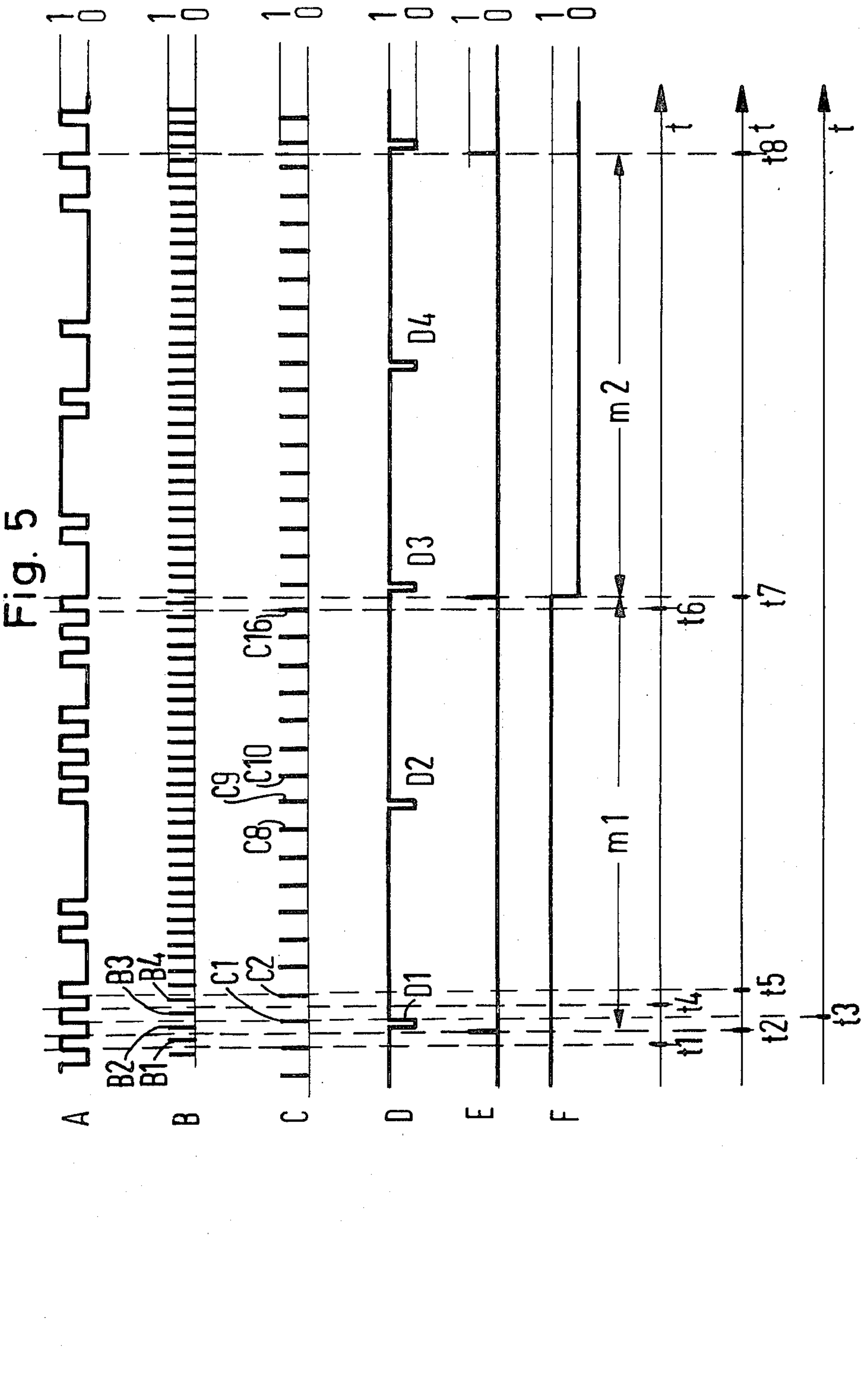
FIG. 5 is a waveform diagram showing signals which occur in the circuit arrangement represented in FIG. 4.

The pulse generator TG produces the pulses BCDEF illustrated in FIG. 5.

The bistable trigger stages K1 to K4 possess the inputs *a*, *b*, *c*, *d*, *e* and the outputs *f* and *g*. The two stable states of these trigger stages are referred to as O-state and as 1-state. Similarly, the two binary values of binary signals are referred to as 0-value and as 1-value and the corresponding signals as 0-signal and 1-signal. For the duration of the 0- and 1-state, a 0- and a 1-signal is emitted via the output *f*. A transition from the 1-state into the 0-state takes place when a 0-signal appears at the input *a* and a negative pulse edge lies at the input *b*, or when a 0-signal lies at the input *e*.

The shift registers SCH1, SCH2 and the store SP together form a buffer register PU which simultaneously carries out a serial/parallel conversion. The pulses C are conducted to the shift registers SCH1 and SCH2 as shift pulses. Both shift registers are each designed for 16 bits. The signal K from the output *c* and the signal L from the output *d* of the allocator Z02 are input in serial fashion into the shift register SCH1 and SCH2, and transferred in parallel into the store SP which is designed for 32 bits. With the signal E, all the bits stored in the store SP are output in parallel. The first bits K1, L1 of the signals K and L are stored in the first two cells of the store SP and are output in parallel. The second and third bits and all other bits up to the 16th bits K16, L16 of the signals K, L are input and output in parallel, in this sequence.

The phase modulator PMO obtains the signal F and a rectangular signal N1, the pulse repetition frequency of which is 3520 Hz. With the signal F=0, the phase modulator PMO emits the signal PO which is equal to the signal N1. With the signal *F*=1, the phase modulator PMO effects a phase shift of 180° so that in this case, as signal PO, a signal is emitted which in terms of pulse shape and pulse repetition frequency is identical to the signal N1, but whose phase is displaced by 180°. The signal PO is used as phase reference signal.

The phase modulator PM17 is supplied with the signal F and with the rectangular signal N91 whose pulse repetition frequency amounts to 4160 Hz. With F=0 the signal P17 is equal to the signal N91. With the signal F=1, as signal P17 a signal is emitted whose shape and pulse repetition frequency is equal to the signal N91 whose phase is however displaced by 180° in relation to the phase of the signal N91. The signal P17 is likewise used as phase reference signal.

A total of 16 phase modulators of which, to simplify the drawing, only the phase modulators PM1, PM8, PM9, PM16 have been shown, are connected to the store SP. These phase modulators emit corresponding, phase-modulated signals P1, P18, P9, P16. The phase modulator PM1 obtains on the one hand the signals K1, L1 and on the other hand the rectangular signals N21, N22, which possess a pulse repetition frequency of 3600 Hz and whose phase state differs by 90°. The phase modulator PM1 emits the signal P1 whose pulse repetition frequency is equal to the pulse repetition frequencies of the signals N21 and N22 and whose phase state is dependent upon the individual bits of the signals K and L as shown in Table 4.

Table 4

| K1 | L1 | Phase of P1 relative to signal N1 |
|---|---|---|
| 0 | 0 | 0° |
| 0 | 1 | 90° |
| 1 | 0 | 180° |
| 1 | 1 | 270° |

Thus in accordance with Table 4, when K1=1 and L1=0 a signal P1 with a phase of 180° is emitted. The phase modulators PM2 to PM16 all operate similarly to the phase modulator PM1.

The signals P0 to P8 and P9 to P17 are conducted to the adder SU1 and SU2, respectively, which emit the sum signal Q1 and Q2, respectively, to the frequency converters FU1 and FU2, respectively. The frequency converter FU1 effects a frequency displacement of 5.2 kHz and emits the signal R1, whereas the frequency converter FU2 effects a frequency displacement of 5.92 kHz and emits the signal R2 to the adder SU3. In the adder SU3 a sum signal S is obtained and conducted to the transmitter SE illustrated in FIG. 1.

In the following the mode of operation of the circuit arrangement illustrated in FIG. 4 will be explained making reference to the signals represented in FIG. 5. Firstly, it will be assumed that from the time *t*1 to the time *t*2 with A=1, a first bit, and from the time *t*2 to the time *t*3 with A=0 a second bit is conducted to the circuit arrangement illustrated in FIG. 2 and that the trigger stages K1, K2, K3, K4 assume their 0-states. Under these conditions with the pulse B1 of the signal B the first bit is recorded in the trigger stage K1 and with the pulse B2 the first bit is transferred into the trigger stage K2 and the second bit of the signal A is stored in the trigger stage K1. Similarly, in turn all the bits of the signal A are transferred into the trigger stages K1 and K2 and made available via the outputs *f*.

The pulse D1 of the signal D is conducted to the inputs *e* of the trigger stages K3 and K4. As 0-states of the trigger stages K3 and K4 have already been assumed, these 0-states are not changed with the pulse D1.

Under the assumed conditions the word 1000 lies at the inputs *a*, *b*, *c*, *d* of the allocator Z01, so that via the outputs *e* and *f* the word is emitted 10 which appears at the inputs of the allocator Zo2 and at the inputs a of the trigger stages K3 and K4. The allocator Zo2 operates in accordance with Table 2, so that, via the latter's outputs *c* and *d* with K=1 and L=1, the word 11 is emitted to the shift registers SCH1 and SCH2. With the pulse C1 this word 11 is transferred into the shift registers SCH1 and SCH2. However, with the pulse C1 the word 10 which has been emitted via the outputs *e* and *f* of the allocator Z01 is fed into the trigger stages K3 and K4.

With the pulses B3 and B4 the next two bits of the signal A are, from the time *t*3 until the time *t*5 transferred into the trigger stages K1 and K2 and, in a further sequence using the allocators Z01 and Z02 other bits are emitted correspondingly in accordance with Tables 1 and 2.

In each case 8 bits of the signal K and of the signal L are input with the pulses C1 to C8 into the shift registers SCH1 and SCH2. Then, with the pulse D2, the two trigger stages K3 and K4 are set in their 0-states in which they in each case emit 0-signals via the outputs F, and from the pulse C9 to the pulse C16 a similar recoding of the signal A is carried out as has already been carried out with the pulses C1 and C8.

With the pulse E1 the contents of the shift registers SCH1 and SCH2 are transferred into the store SP. Here, via the first two outputs of the store SP, are emitted the bits K1 and L1 which correspond to those bits of the signal A which have been supplied at the input from the time *t*1 to the time *t*3. With K1=1 and L1=1, the phase modulator PM1 produces a signal P1 which possesses a phase difference of 270° in relation to the signal N1.

The time interval from the time *t*2 to the time *t*7 is referred to as modulation section *m*1. Within such a modulation section *m*1, 16 dibits of the signal A are processed. From the time *t*1 to the time *t*6 a total of 32 bits of the signal A arrive and the signals P1 to P16 corresponding to these 32 bits of the signal A are transmitted from the time *t*7 until the time *t*8.

At the time *t*7, with F=0 both the signal P0 and also the signal P17 are emitted having no phase shift in relation to the signal N1 and N91. The signal F=0 remains in existence for two modulation sections and during the following two modulation sections F=1. For example, during the modulation section M2, the signal F=1 so that during this modulation section M2 the signals P0 and P17 are rotated in phase by 180° in relation to the signals N1 and N91, respectively. During the modulation sections M1 and M2 the pulses D1 to D4 effect the input of 0-values into the trigger stages K3 and K4 and during the following two (not illustrated) modulation sections 1-values are input into the trigger stages K3 and K4.

Figure 6:
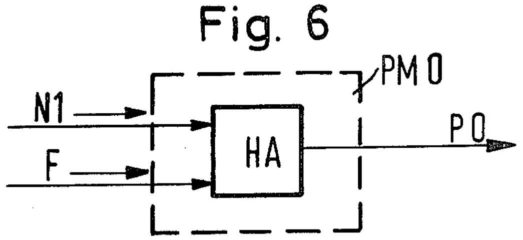
FIG. 6 is a block diagram of a phase modulator including a half adder.
Figure 7:
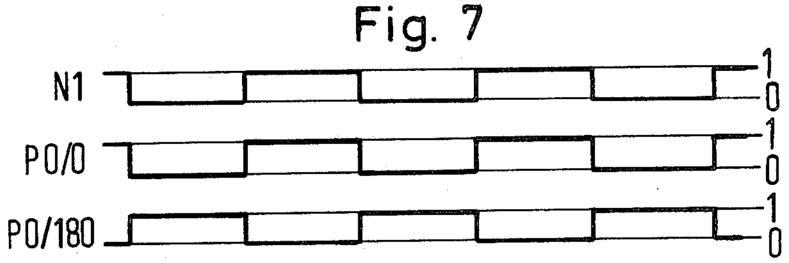
FIG. 7 is a waveform diagram showing signals which occur in the phase modulator shown in FIG. 6.

FIG. 6 shows the phase modulator PM0 comprising the half adder HA. This half adder HA is supplied with the rectangular signal N1 shown in FIG. 7 and with the signal F shown in FIG. 5. With F=0, as output signal P0, the signal P0/0 is emitted whereas with F=1 the signal P0/180 is emitted. The signals N1 and P0 differ thus, only in respect of their phase state and possess the same pulse repetition frequency of 3520 Hz. The phase modulator PM17 is of identical construction to the phase modulator PM0. Instead of the signal N1, the phase modulator PM17 is supplied with the signal N91 which possesses a pulse repetition frequency of 4160 Hz. The signal P17 thus, likewise, possesses a pulse repetition frequency of 4160 Hz, and thus differs only by a phase state altered by 180°, if the signal F assumes a 1-value.

Figures 8, 9:
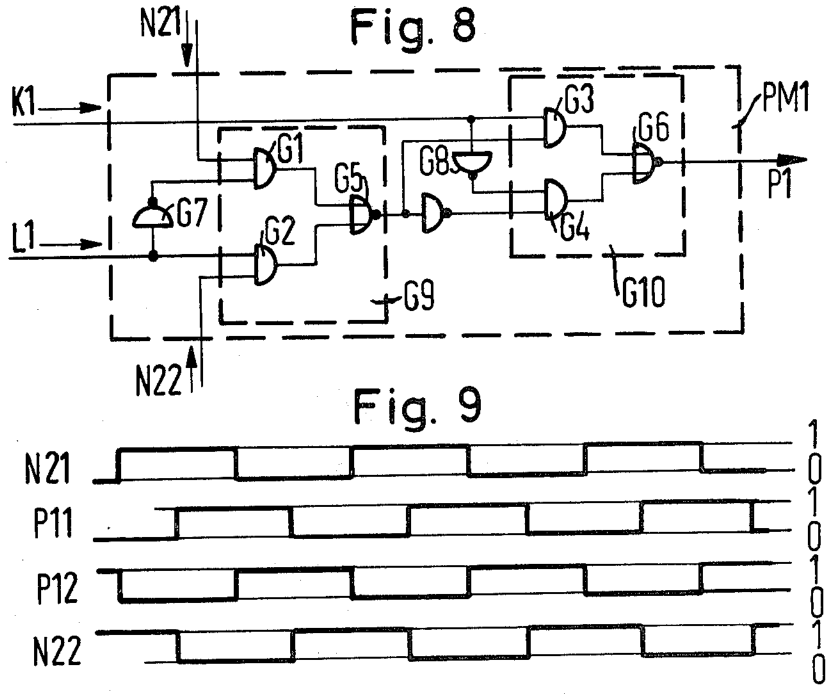
FIG. 8 is a schematic diagram of a phase modulator equipped with two exclusive-OR-gates and FIG. 9 is a waveform diagram illustrating signals which occur in the case of the phase modulator illustrated in FIG. 8.

FIG. 8 shows in more detail the phase modulator PM1 illustrated in FIG. 4. The other phase modulators PM2 to PM16 are of similar construction.

The phase modulator PM1 comprises AND gates G1, G2, G3, G4, NOR gates G5, G6 and NOT gates G7, G8. The combinations of gates G1, G2, G5 and the gates G3, G4, G6 in each case form an exclusive OR gate G9 and G10 respectively. The operation of this circuit is best described utilizing a truth table which is set forth hereinbelow as Table 6.

FIG. 9 represents the rectangular signal N21 which posesses a pulse repetition frequency of 3600 Hz. The signal N22 possesses the same pulse repetition frequency, but a phase state displaced by 90°. The binary signals K1 and L1 are supplied by the store SP shown in FIG. 4. The phase state of the signal P1 is dependent upon these binary signals K1, L1. With K1=0 and L1=0, the signal P12 is emitted as signal P1. With K1=0 and L1=1, the signal P11 is emitted as signal P1. With K1=1 and L1=0 the signal N21 is emitted as signal P1 and with K1=1 and L1=1 the signal N22 is emitted as signal P1.

Table 5 shows the pulse repetition frequencies in Hz. which in accordance with FIG. 4 are supplied to the phase modulators PM0 to PM17.

Table 5

| Signals | Pulse repetition frequencies |
|---|---|
| N1 | 3520 |
| N21 | 3600 |
| N31 | 3680 |
| N41 | 3760 |
| N51 | 3840 |
| N61 | 3920 |
| N71 | 4000 |
| N81 | 4080 |
| N91 | 4160 |

The phase modulated signals P0 and P8 and the phase modulated signals P9 to P17 possess the pulse repetition frequencies of the signals N1 to N91.

The embodiments described hereinabove are intended only to be exemplary of the principles of the invention. It is contemplated that the described embodiments can be modified or changed, while remaining within the scope of the invention, as defined by the appended claims.

I claim:

1. Apparatus for frequency differential phase modulation of data signals in the form of binary words and by means of which carrier frequencies are phase modulated such that the smallest increment in phase difference between two phase modulated carriers is produced by one bit of a binary word, comprising:

encoder means having a number $n$ inputs and a number $n$ outputs, these being $2^n$ stages of phase modulation, said encoder means being constructed to assume one of $2^n$ stable conditions in dependence on which of said $n$ inputs receive binary data and to produce from said $n$ outputs code words arranged in a dual code if said binary data applied to said $n$ inputs is in the Gray code, buffer register means having inputs coupled to said $n$ outputs of said encoder means and a plurality of phase modulators coupled to outputs of said buffer register means for supplying phase-modulated carrier frequencies as functions of said code words.

2. The apparatus defined in claim 1 wherein said encoder means comprises:

a first allocator having first and second sets of $n$ inputs and $n$ outputs, said second set of $n$ inputs receiving said binary data to be transmitted, $n$ binary stages having inputs connected to said $n$ first allocator outputs and outputs connected to said first set of $n$ inputs of said first allocator and a second allocator having inputs connected to the outputs of said first allocator.

3. The apparatus as claimed in claim 1, wherein in the event of four stage phase modulation the encoder means includes means for assigning the binary words 00, 01, 11, 10, respectively the words 00, 01, 10, 11 and wherein there are a plurality of phase modulators for assigning the words 00, 01, 10, 11, respectively, the phases 0°, 90°, 180°, 270°.

4. The apparatus as claimed in claim 1, wherein in the case of eight stage phase modulation, the encoder means includes means for assigning the binary words 000, 001, 011, 010, 110, 111, 101, 100, respectively, the words 000, 001, 010, 011, 100, 101, 110, 111 and wherein there are a plurality of phase modulators for assigning the words 000, 001, 010, 011, 100, 101, 110, 111, respectively, the phases 0°, 45°, 90°, 135°, 180°, 225°, 270°, 315°.

5. Apparatus as claimed in claim 2, wherein the outputs of the second allocator are connected to a first and second shift register and the words from the outputs of said second allocator are coupled in serial fashion into said first and second shift registers, the shift registers emitting the stored items of information in parallel to a store, the outputs of this store being connected by groups to the phase modulators.

* * * * *